United States Patent
Landers et al.

(10) Patent No.: US 6,240,821 B1
(45) Date of Patent: Jun. 5, 2001

(54) DUAL POSITIONING AND ORIENTING SAW INFEED APPARATUS

(75) Inventors: Richard Landers, North Ogden, UT (US); Adrian Landers, American Falls, ID (US); Earl Jarman, South Weber; Matthew Eggington, Kaysville, both of UT (US)

(73) Assignee: LandEast Machinery, Inc., Ogden, UT (US)

( * ) Notice: Subject to any disclaimer, the term of this patent is extended or adjusted under 35 U.S.C. 154(b) by 0 days.

(21) Appl. No.: 09/353,434

(22) Filed: Jul. 15, 1999

(51) Int. Cl.[7] .................................................. B27B 29/00
(52) U.S. Cl. ............................... 83/364; 83/356; 83/419; 83/75.5
(58) Field of Search .............................. 83/360, 364, 356, 83/367, 76.8, 74, 75.5, 418, 419, 421, 423, 425.2

(56) References Cited

U.S. PATENT DOCUMENTS

| | | |
|---|---|---|
| 3,665,984 | 5/1972 | Ackerfeldt . |
| 4,164,248 * | 8/1979 | Rysti ..................................... 144/312 |
| 4,333,373 * | 6/1982 | Blickenderfer .......................... 83/419 |
| 4,413,662 * | 11/1983 | Gregoire et al. ...................... 144/365 |
| 4,462,443 * | 7/1984 | Allen ..................................... 144/242 |
| 4,468,992 * | 9/1984 | McGeehee ............................... 83/56 |
| 4,690,186 | 9/1987 | Chapman . |
| 4,702,134 * | 10/1987 | Corley, III ................................ 83/71 |
| 4,794,963 * | 1/1989 | Oppeneer .............................. 144/358 |
| 4,945,797 * | 8/1990 | Hahn ..................................... 83/75.5 |
| 4,947,909 * | 8/1990 | Stroud ..................................... 144/35 |
| 5,115,846 | 5/1992 | Miller et al. . |
| 5,381,712 | 1/1995 | Head, Jr. et al. . |
| 5,429,151 * | 7/1995 | Allard ..................................... 144/246 |
| 5,544,558 * | 8/1996 | Hughes ................................... 83/75.5 |
| 5,765,615 | 6/1998 | Chapman et al. . |
| 5,785,102 * | 7/1998 | Hamel ..................................... 144/387 |
| 5,819,622 * | 10/1998 | Quick ..................................... 83/365 |
| 5,826,637 | 10/1998 | Newnes et al. . |
| 5,865,080 * | 2/1999 | Jackson ..................................... 83/74 |
| 5,870,936 * | 2/1999 | McGehee ................................. 83/13 |
| 5,907,986 | 6/1999 | Buchacher . |

\* cited by examiner

*Primary Examiner*—M. Rachuba
*Assistant Examiner*—Kim Ngoc Tran
(74) *Attorney, Agent, or Firm*—Thrope North & Western, LLP

(57) ABSTRACT

A method and apparatus for simultaneously orienting and positioning first and second different boards, and for feeding the first and second boards along first and second saw axes, respectively, into at least one saw feeds sets of at least two boards at a time to increase the piece rate, while orienting and positioning each board individually to increase the yield rate. A lateral feed mechanism displaces the boards in laterally to a staging area. A first pair of movable stops cooperatively and independently moves to orient and position the first board axis parallel with a first alignment axes. Similarly, a second pair of movable stops cooperatively and independently moves to orient and position the second board axis parallel with a second alignment axes. A moveable displacement arm moves in the lateral direction between the staging area and a feed area for engaging and simultaneously displacing the boards together from the staging area to the feed area. Spaced apart grips are attached to the arm for releasably engaging the boards. A longitudinal feed mechanism is located in the feed area for engaging and feeding the boards in a longitudinal direction into the at least one saw along the feed axes.

24 Claims, 7 Drawing Sheets

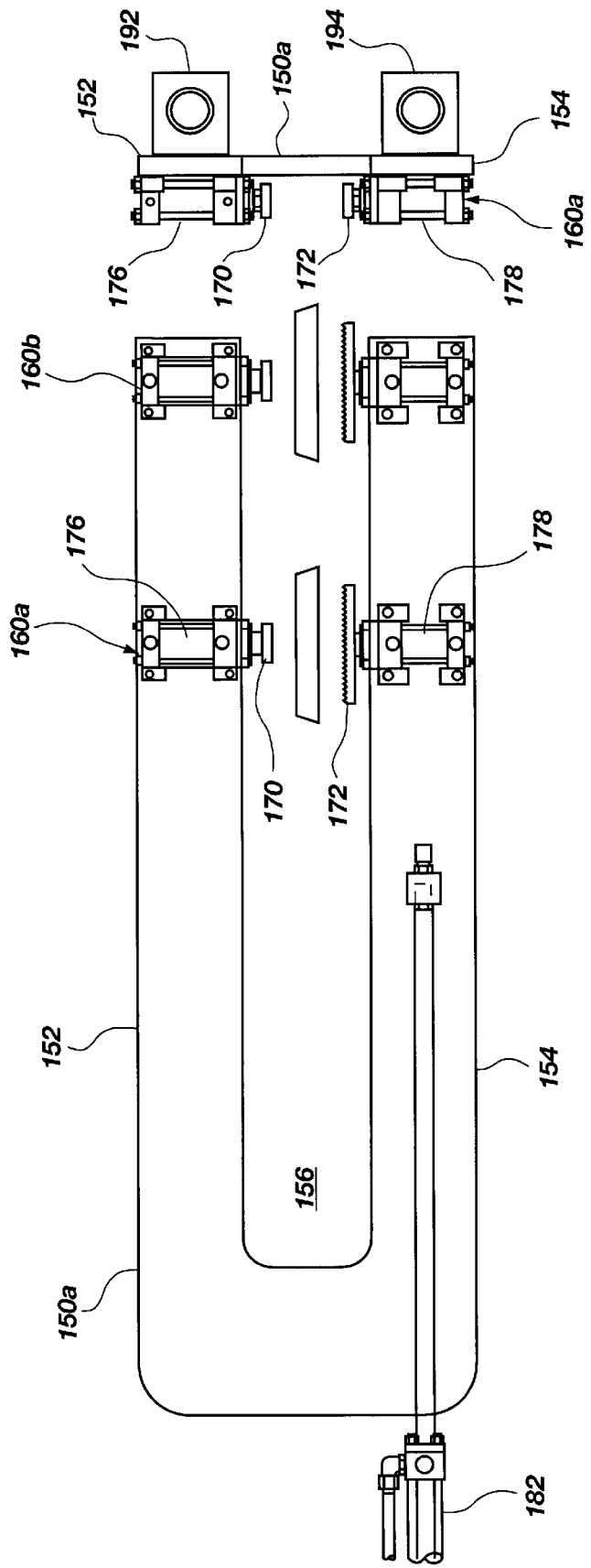

DUAL POSITIONING AND ORIENTING SAW INFEED APPARATUS

BACKGROUND OF THE INVENTION

1. The Field of the Invention

The present invention relates generally to a method and apparatus for positioning, skewing (or orienting) and feeding at least two boards into one or more saws simultaneously as part of a sawing operation. More particularly, the present invention relates to a method and apparatus in which the at least two boards are separately positioned and oriented, and feed into the one or more saws.

2. The Background Art

The demand for lumber has increased do an increase in residential and commercial building activity which utilizes lumber. In addition, wood has traditionally been in demand for furniture and other finished products. Furthermore, environmental regulation has limited the supply of raw timber. As a result, the amount of trees suitable for producing lumber is decreasing and the cost of lumber is increasing. Thus, the timber industry continually searches for ways to optimize lumber production by increasing (1) the yield rate, and (2) the piece rate. For example, it is desirable to maximize the amount of usable lumber from a single piece of raw wood. As another example, it is desirable to increase the production rate and efficiency of lumber production. Thus, two goals of lumber production are (1) accuracy in cutting the lumber to maximize yield, and (2) speed and efficiency in cutting the lumber to maximize the production or piece rate.

Sawmills typically utilize a number of machines to reduce raw trees to usable lumber. Such machines include headrig machines which cut opposite edges of the initial rounded log; ganged saws which cut the wood into a number of flat or mostly flat boards; edger machines which cut rounded sides off the flat boards; trimmer machines which cut the boards to length, etc. The machines are usually arranged so that the wood follows a path through the various machines, or flows through the sawmill.

It will be appreciated that raw wood or trees are often irregular and contain imperfections. For example, a piece of wood may be crooked or bent; have indentations or areas of reduced diameter; and have splits or other voids. Thus, a system which treats all pieces the same will inevitably produce a great deal of lumber which is unusable due to the irregularities and imperfections, and thus is wasted.

Some machines allow an operator to position and/or orient the wood in an attempt to maximize the usable lumber and avoid imperfections. For example, an operator may position a board with respect to an edger saw so that the board is fed into the edger saw with respect to particular saw blades to maximize the yield. The saw blades are usually spaced at specific and different increments so that a particular board may be cut in multiple ways. The position of the board with respect to the blades determines the size and number of cuts. Thus, the operator may take note of any irregularities or imperfections in the board and position the board with respect to the saw blades to maximize the usable lumber. In addition, some machines allow the operator to skew or pivot the board with respect to the feed axis of the saw. Thus, the board may not only be positioned with respect to particular saw blades, but also may be aligned or oriented with the feed axis to maximize the yield. One such machine allows the operator to grasp the board with the machine at a distant staging area and skew the board with respect to a reference line which is parallel with, and distant from, the feed axis. The operator may then independently transport the properly skewed board to a feed area and position the board with respect to the blades, while the board remains properly skewed.

Various machines or parts of the process may be automated or partially automated. It is desirable to automate the process as much as possible to remove any operator error. For example, an operator may position or orient a board based on the best judgement of the operator because it is not economically or physically feasible for the operator to stop the process and measure every board to determine the maximum possible yield.

As indicated above, it is also desirable to optimize the process for speed, as well as efficiency. Such optimization includes the manner in which the wood is handled. For example, many machines are designed to process a single board at a time. Thus, other associated equipment is similarly designed to process a single board at a time. Although the equipment runs continuously, standard piece rates are approximately 30–35 pieces per minute for a computer operated system, while manual systems run at a maximum of 15 pieces per minute.

Some effort has been directed towards increasing the piece rate by more rapidly handling the wood. For example, U.S. Pat. No. 5,115,846, issued May 26, 1992, to Miller et al., discloses an edger charger system with a positive-action, pinch-roll mechanism moved under the influence of a linear positioner which rapidly shuttles a board from a precharge station to an intake station. The system of Miller et al. allegedly achieves piece rates of 45 pieces per minute.

One disadvantage with such equipment is that they are designed to process a single board at a time. As indicated above, this single treatment of the board is necessitated by the irregularities or dimensional variations is the raw wood.

Another disadvantage with such single-board machines that are designed to run faster is accuracy. As the speed, or piece rate, is increased, accuracy is lost. Running single boards through the machine faster increases the number and ease of which boards are damaged. In addition, the precision of the cuts is lost, thus reducing the yield rate, and producing more defective lumber. Furthermore, initial costs are increase significantly, maintenance costs are increased, and safety decreases.

Therefore, the dual goals of increased yield rate and increased piece rate appear at times to be at odds; increased yield rate requiring accuracy and unique treatment of each board, and increased piece rate requiring speed and equal treatment of each board. The desire for efficient yield rates prevents boards from simply being processed together. Thus, conventional equipment has been designed to treat each board individually and one at a time to achieve an efficient yield, but to do so as rapidly as possible to satisfy a rapid piece rate.

Therefore, it would be advantageous to develop a method and apparatus to position, orient, and/or feed multiple boards to optimize the piece rate, while still optimizing the yield from each board. It would also be advantageous to develop a method and apparatus to more efficiently and rapidly process the boards to maximize both the production rate and the yield rate. It would also be advantageous to develop such a method and apparatus capable of improving the handling of the boards.

OBJECTS AND SUMMARY OF THE INVENTION

It is therefore an object of the present invention to provide a method and apparatus for positioning, orienting, and/or feeding multiple boards for a saw mill operation, such as an edger, to increase the piece rate of the operation, and for treating each board individually to increase the yield rate.

It is another object of the present invention to provide such a method and apparatus for accurately and rapidly positioning, orienting, and/or feeding boards to optimize the yield and maximize the piece rate.

It is yet another object of the present invention to provide a method and apparatus for improving the handling of boards.

The above objects and others not specifically recited are realized in a specific illustrative embodiment of an apparatus for simultaneously orienting and positioning first and second different boards, and for feeding the first and second boards along first and second saw axes, respectively, into at least one saw. The boards have different edges and first and second board axes. The apparatus of the present invention advantageously increases the piece rate by orienting, positioning, and feeding two boards at a time, while preserving or increasing the yield rate by processing each board individually, or according for the individual characteristics of each board.

Preferably, a lateral feed mechanism displaces the boards in a lateral direction transverse to the saw axes to a staging area. The staging area has first and second alignment axes which are parallel with, and spaced-apart from, the first and second saw axes, respectively. The first and second alignment axes are spaced apart from one another a distance equal to the distance between the first and second saw axes.

A first pair of movable stops preferably is located at the staging area and for abutting the edge of the first board. The first pair of stops cooperatively and independently moves with respect to one another in the lateral direction to orient the first board axis parallel with the first alignment axes. In addition, the stops move to position the first board axis in a common vertical plane with the first alignment axis.

Similarly, a second pair of movable stops, independent from the first pair of stops, preferably is located at the staging area proximal to the first pair of stops for abutting the edge of the second board. Again, the second pair of stops cooperatively and independently moves with respect to one another in the lateral direction to orient the second board axis parallel with the second alignment axes. In addition, the stops move to position the second board axis in a common vertical plane with the second alignment axis. Therefore, the first and second boards are separately oriented, and separately positioned, with respect to the first and second alignment axes, respectively. A moveable displacement arm moves in the lateral direction between the staging area and a feed area for engaging and simultaneously displacing the first and second boards together from the staging area to the feed area. The arm has a length sized to extend to both the first and second boards. Thus, the first and second boards are simultaneously displaced laterally from the staging area to the feed area.

First and second spaced apart grips are attached to the arm for releasably engaging the first and second boards, respectively. The first and second grips are spaced-apart from one another by a distance generally equal to the distance between the first and second saw axes and the first and second alignment axes.

A longitudinal feed mechanism is located in the feed area for engaging and feeding the first and second boards in a longitudinal direction transverse to the lateral direction into the at least one saw along the first and second feed axes, respectively.

In accordance with one aspect of the present invention, each of the grips has an upper clamp member and a lower clamp member. The upper clamp member engages an upper side of the board, while the lower clamp member engages a lower side of the board. An upper actuator exerts an amount of force on the upper side of the board, and a lower actuator exerts an amount of force on the lower side of the board. The amount of force exerted by the lower actuator is greater than the amount of force exerted by the upper actuator. Thus, the board is displaced in a vertically upward direction by the lower clamp member. Preferably, the upper actuator is a pneumatic piston/cylinder, and the lower actuator is a hydraulic piston/cylinder.

In accordance with another aspect of the present invention, a sensor senses a specified characteristic of the boards and produces a sensor signal corresponding to the specified characteristic of the boards. A controller receives the sensor signal and determines the location and orientation of the board axes with respect to the edges of the boards, and produces a control signal.

A method for feeding the different boards into the at least one saw includes determining the location and orientation of the board axes with respect to the edges of each of the at least two boards. The boards are positioned at the staging area relative to the two alignment axes which are each related to a different one of the at least two saw axes.

The board axes are separately oriented parallel with a different one of the at least two alignment axes by positioning stops which abut the edges of the boards. In addition, the board axes are separately positioned vertically co-planar with a different one of the at least two alignment axes by positioning the stops. Thus, the board axes of each of the at least two boards are parallel to and spaced equal distances from different saw axes.

The boards are then simultaneously displaced laterally from the staging area to a feed area proximal the at least one saw. Thus, the board axes are each vertically co-planar with a different one of the at least two saw axes.

Finally, the boards are displaced longitudinally from the feed area into the at least one saw along the at least two saw axes.

In accordance with one aspect of the present invention, a second set of at least two boards are separately oriented and positioned parallel and vertically co-planar with the at least two alignment axes simultaneously as the first set of at least two boards are longitudinally displaced into the saw.

Additional objects and advantages of the invention will be set forth in the description which follows, and in part will be apparent from the description, or may be learned by the practice of the invention without undue experimentation. The objects and advantages of the invention may be realized and obtained by means of the instruments and combinations particularly pointed out in the appended claims.

BRIEF DESCRIPTION OF THE DRAWINGS

The above and other objects, features and advantages of the invention will become apparent from a consideration of the subsequent detailed description presented in connection with the accompanying drawings in which:

FIG. 6 is an end view of a preferred embodiment of a displacement arm of the apparatus for positioning, orienting, and feeding boards in the sawmill operation of the present invention.

FIG. 7 is a side view of the preferred embodiment of the displacement arm of the apparatus for positioning, orienting, and feeding boards in the sawmill operation of the present invention.

DETAILED DESCRIPTION

Figure 1:
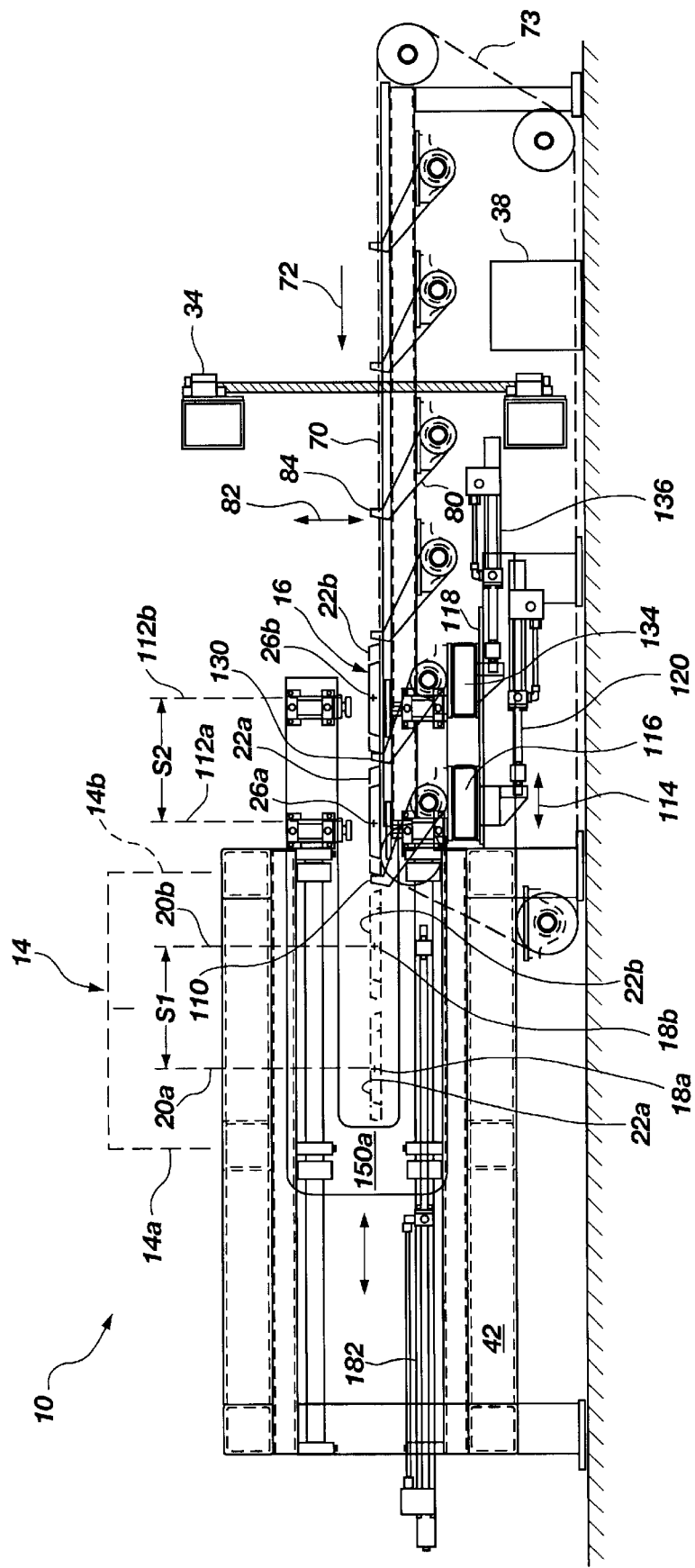
FIG. 1 is an end view of a preferred embodiment of an apparatus for positioning, orienting, and feeding boards in a sawmill operation of the present invention, with a longitudinal feed mechanism removed for clarity.

For the purposes of promoting an understanding of the principles in accordance with the invention, reference will now be made to the embodiments illustrated in the drawings and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would normally occur to one skilled in the relevant art and having possession of this disclosure, are to be considered within the scope of the invention claimed.

As illustrated in FIGS. 1–4, an apparatus, indicated generally at 10, in accordance with the present invention is shown for positioning, orienting, and feeding boards as part of a sawmill operation. The particular sawmill operation may include any type of cutting, edging, trimming, or the like, and may include any type of machine for cutting, edging, or trimming or the like. As shown in the drawings and described herein, the apparatus 10 of the present invention is configured for particular use in feeding boards into one or more saws 14, such as edgers, as shown schematically in phantom lines in FIG. 1. The saw 14 may be a single saw sized to edge two boards at once in parallel, or may be two adjacent saws 14a and 14b. It is of course understood that the saw 14 represents any type of machine(s) or equipment used in a sawmill operation.

In addition, the apparatus 10 of the present invention is configured to feed boards, indicated generally at 16. The term "board" is used generally to mean a workpiece as would be processed in a saw mill, and includes, for example, logs and cants. The boards 16 may be cut from a cant, and thus have different edges defined by the various outer surface characters of a log.

Figure 4:
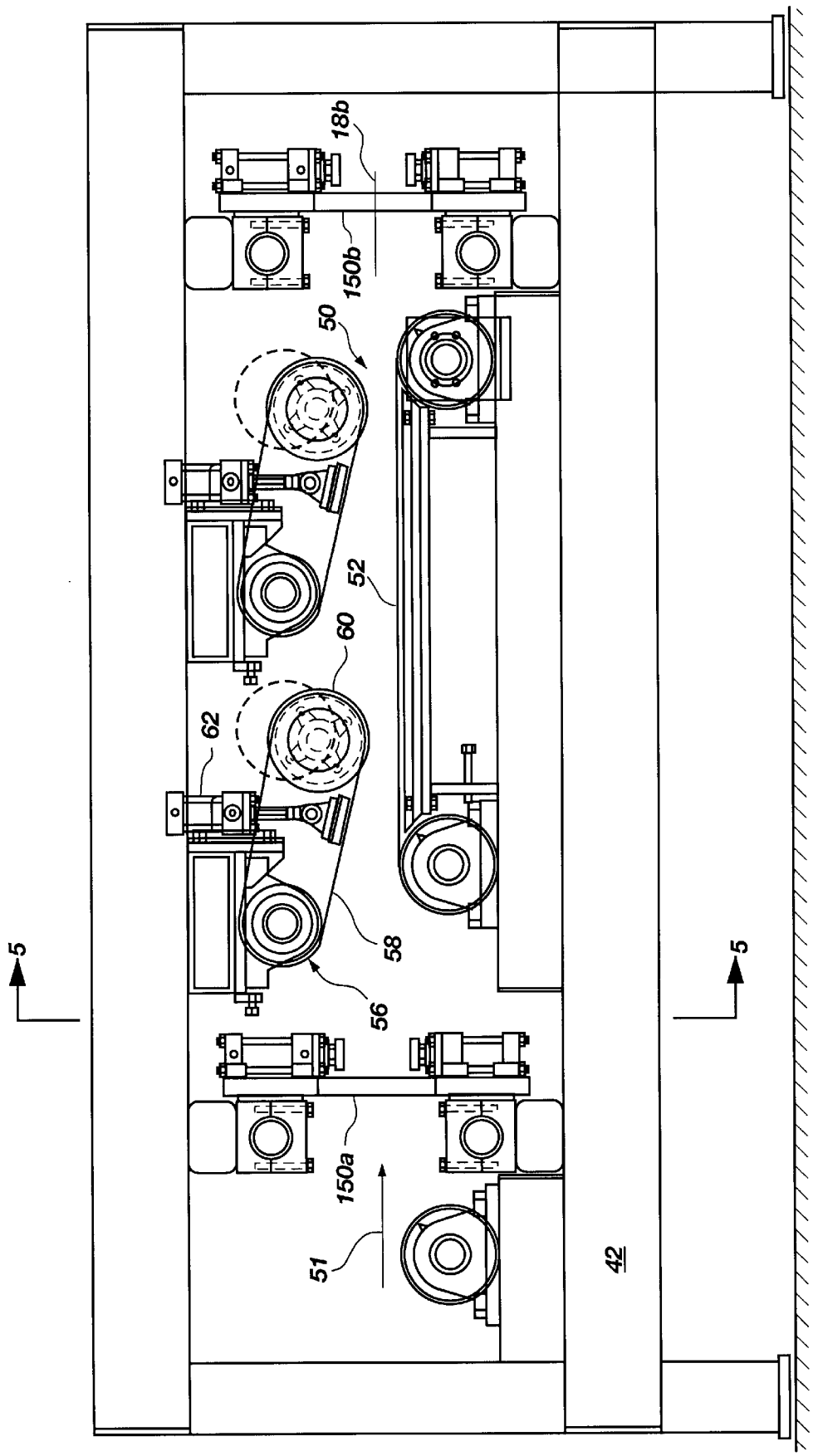
FIG. 4 is a side view of the preferred embodiment of the longitudinal feed mechanism, displacement arms, and frame of the apparatus for positioning, orienting, and feeding boards in the sawmill operation of the present invention, with the lateral feed mechanism removed for clarity.

The saw 14, or saws 14a and 14b, have at least first and second saw axes or centerlines, indicated generally at 18a and 18b in FIG. 4, or saw paths along which boards 16 are cut. The saw axes or centerlines 18a and 18b are contained within first and second vertical planes 20a and 20b, respectively. The saw axes 18a and 18b, and the corresponding vertical planes 20a and 20b, define saw paths and centerlines along which the boards 16 are fed. A known, constant distance S1 separates the saw axes 18a and 18b, and their corresponding vertical planes 20a and 20b. It is of course understood that the saw 14 may have more than two saw axes.

In accordance with one aspect of the present invention, the apparatus 10 advantageously processes sets of at least two boards 16 at a time to increase the piece rate, but treats each board individually to preserve the yield rate, or to reduce waste. A first set of boards 22, including first and second boards 22a and 22b, is shown in solid lines at a staging or queing position in FIGS. 1 and 2, and in dashed lines at a feed position in FIGS. 1 and 2. The first and second boards 22a and 22b have first and second board axes 26a and 26b, and first and second leading edges 30a and 30b. The board axes 26a and 26b are generally center lines of the finished or sawn boards, or center lines of an optimal piece of lumber defined within the board. It is of course understood that the apparatus of the present invention may be configured to process set of more than two boards at a time.

Figure 8:
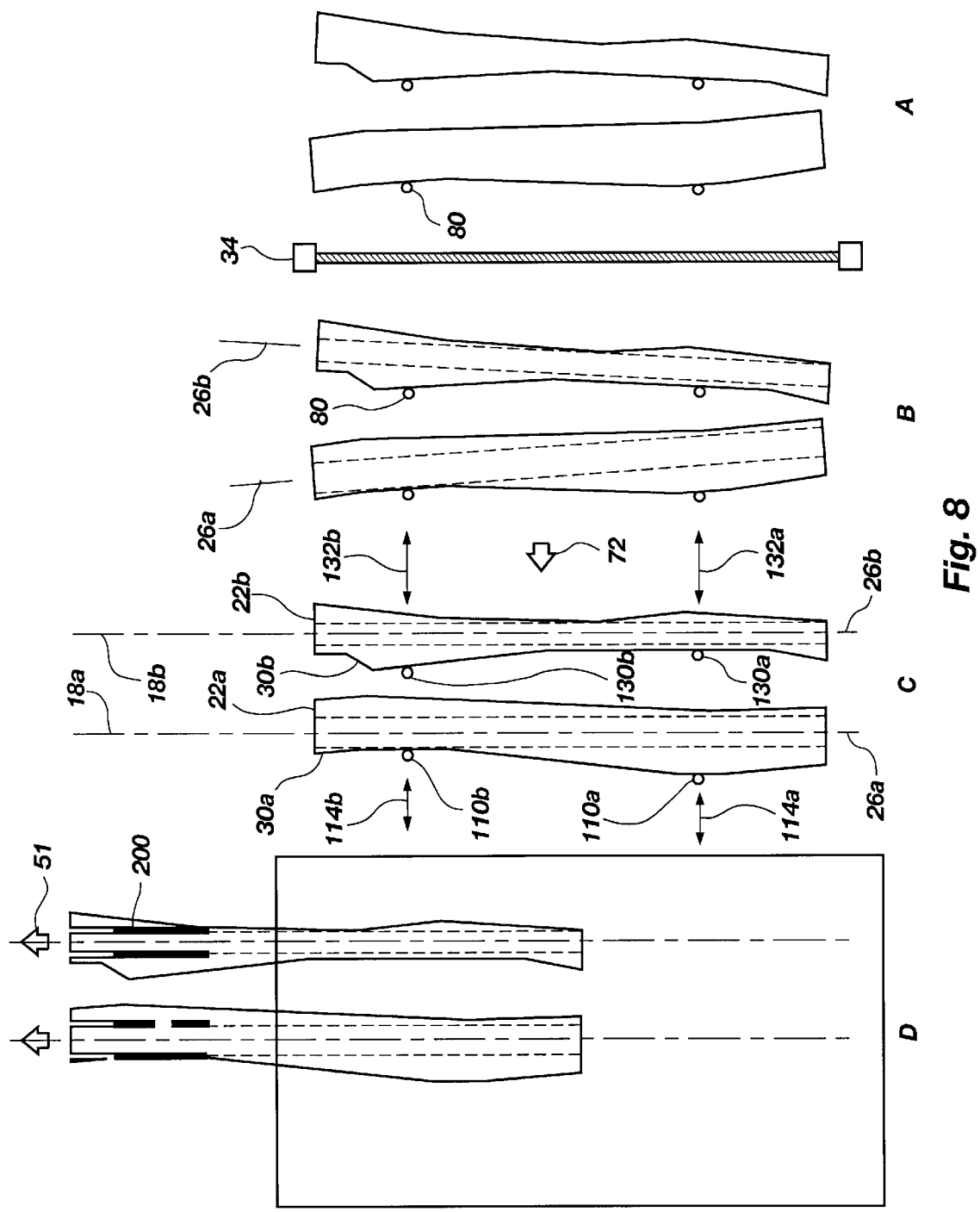
FIG. 8 is a schematic view of a preferred embodiment of a method for positioning, orienting, and feeding boards in the sawmill operation of the present invention.

As indicated above, the boards 16 are most likely different, or have variations and irregularities in size, shape, consistency, etc. Referring to FIG. 8, the first and second boards 22a and 22b are shown at various stages of being processed. The first and second boards 22a and 22b may be cut from logs or cants such that they have somewhat rounded and irregular edges defined by the outer surface of the log from which they were cut. For example, the first board 22a may be relatively straight, with irregular, tapering edges, as shown; while the second board 22b may be curved, as shown. Each board may be cut to optimize the amount of usable lumber. For example, the first board 22a may be cut along the dashed lines to obtain a 2×8, while the second board 22b may be cut along the dashed lines to obtain a 2×4. In either case, the boards must be correctly and accurately positioned and oriented. If either board is positioned too far to either side, the resulting lumber will have an irregular edge, or be useless. Similarly, if either board is misaligned, or mis-oriented, the resulting lumber will again have an irregular edge, or be useless.

It will also be noted that the boards 20a and 20b may not be simply positioned and oriented according to their respective leading edges 30a and 30b because the leading edges are irregular, spaced varying distances from the center lines of the boards, and/or not parallel with the optimal center lines. For example, the board axis 26a of the first board 22a is not parallel with the leading edge 30a, and the dashed line of the optimal resulting lumber is positioned relatively close to the leading edge. The board axis 26b of the second board 22b also may be non-parallel with the leading edge 30b, and the dashed line of the optimal resulting lumber is positioned relatively far from the leading edge. Thus, simply aligning the boards according to their edges, or otherwise treating each board similarly, will result in wasted wood.

The boards may be positioned and oriented with respect to a saw by a skilled operator who estimates the optimal resulting lumber available from a given board, and positions and orients the board accordingly. Such a system, however, relies merely on operator judgement and is subject to error and inaccuracy. It is preferable to utilize accurate sensors to measure, or otherwise sense board characteristics, and a controller, such as a computer with associated software, or a like controller, to determine the optimum possible lumber available from a given board, as are well known in the art.

For example, one or more sensors 34, such as an infrared or laser scan curtain, may be positioned in the path of the boards 16 to sense one or more specific characteristics of the boards, such as various dimensions, shapes, flaws, etc. The sensor 34 develops sensor signals corresponding to the specific characteristics of the boards.

A controller, indicated schematically at 38 in FIG. 1, such as a computer with software, or another type of hardwired or microchip controller, receives the sensor signals and determines the optimal cutting locations to obtain the maximum yield, as indicated by the dashed lines on the boards of FIG. 8. The computer 38 determines the location and orientation of the board axes 26a and 26b and board edges 30a and 30b with respect to one another, respectively. In addition, the computer 34 may determine the location and orientation of the boards 22a and 22b, or board axes 26a and 26b, and/or the appropriate location and orientation of the board edges 30a and 30b with the saw axes or other axes, discussed below. The controller 38 also produces control signals.

The apparatus 10 of the present invention includes an elongated frame 42 positioned on a support surface adjacent to or proximal to the saw 14, or saws 14a and 14b. The frame 42 has left and right lateral sides, and opposite ends. Boards 16 are received laterally at one side of the frame 42, positioned and oriented along the frame, and fed longitudinally through one of the ends into the saw 14. Due to its size, the frame 42 may be comprised of one or more frame sections, such as the feed section of the frame (shown on the left in FIGS. 1 and 2), and the queing section of the frame (shown in the right in FIGS. 1 and 2), but may be a single, integral frame unit. The sensor 34, or sensor curtain, is located proximal to one side of the frame 42, such that the boards 16 pass by the sensor 34, or through the sensor curtain, as the boards 16 are received by the side of the frame 42. Of course, the sensor 34 may be attached to the frame 42.

A longitudinal feed mechanism 50 is located on the frame 42 for engaging and feeding the boards 16, or sets of first and second boards 22a and 22b, in a longitudinal direction (indicated by arrow 51 in FIGS. 3 and 4) into the saw 14, or saws 14a and 14b, along the first and second saw axes 18a and 18b. The feed mechanism 50 preferably includes a lower conveyor 52 coupled to a motor 54 which is selectively activated to selectively feed the boards 16. The lower conveyor 52 is an endless belt rotating in the longitudinal direction 51, and defines a feed area in which the boards 16 are located while being fed.

Figure 5:
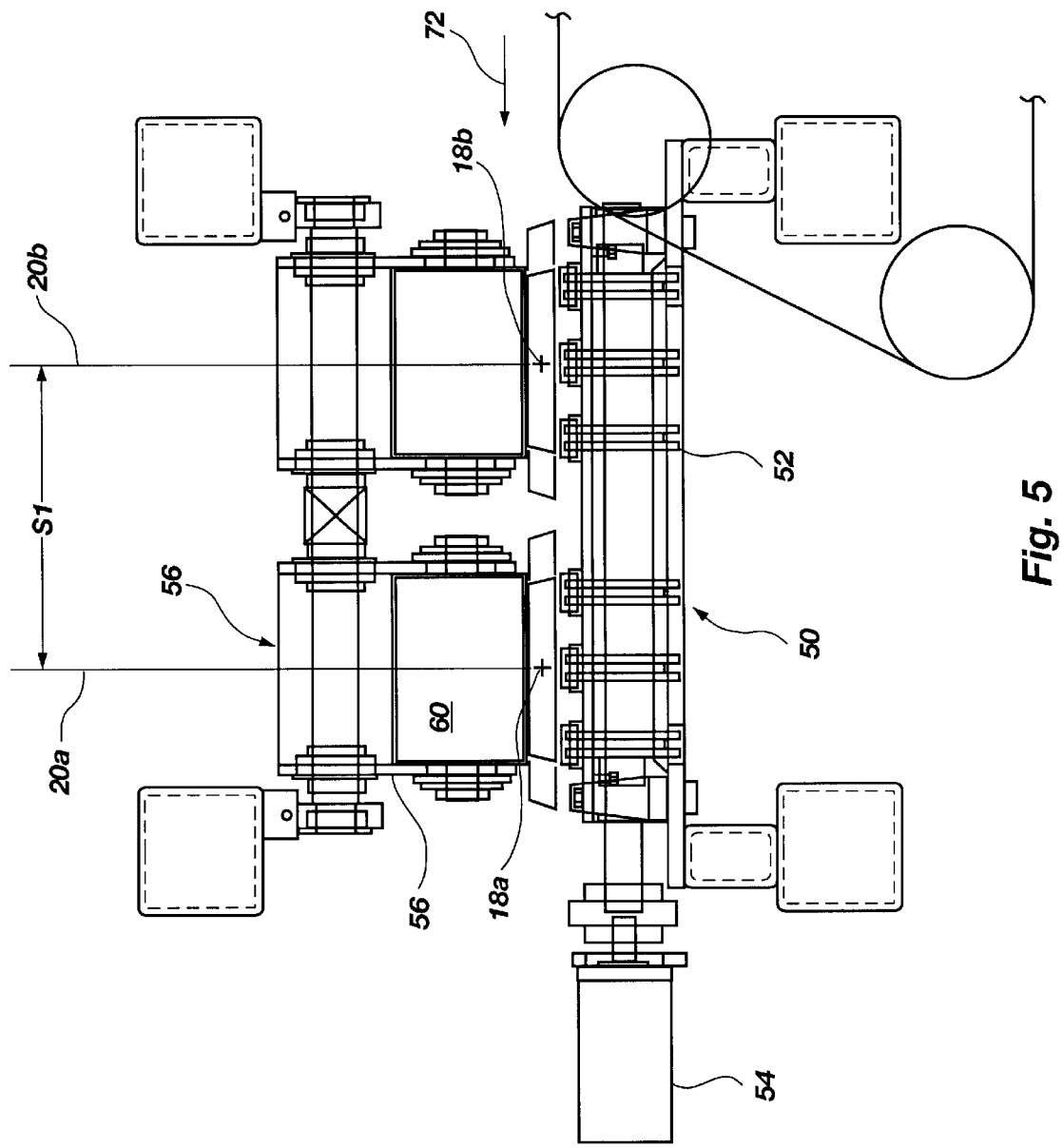
FIG. 5 is a cross sectional end view of the preferred embodiment of the apparatus for positioning, orienting, and feeding boards in a sawmill operation of the present invention taken along line 5—5 of FIG. 4.

In addition, the feed mechanism 50 preferably includes one or more upper conveyors 56 located on the frame 42 above the lower conveyor 52. The upper conveyor 56 is vertically adjustable to vertically and laterally clamp or secure the boards 15 between the lower and upper conveyors 52 and 56. For example, the upper conveyor 56 may be an arm 58 pivotally coupled at one end to the frame 42, and having a roller 60 rotatably coupled to the opposite end. An actuator 62, such as a hydraulic or pneumatic piston/cylinder, pivots the arm 58 in a vertical orientation to secure the boards 16 between the roller 60 and the lower conveyor 52. Thus, the boards 16 are prevented from lateral or vertical movement by the roller 60 of the upper conveyor member 56, while permitted to move in the longitudinal direction 51 under the force of the lower conveyor 52. The longitudinal feed mechanism 50 may include first and second lateral feed mechanisms, as shown in FIG. 5, for feeding the first and second boards 22a and 22b, respectively.

A lateral feed mechanism 70 is located on or attached to the frame 42 proximal to the longitudinal feed mechanism 50, and laterally displaces the boards 16, or sets of first and second boards 22a and 22b, in a lateral direction (indicated by arrow 72 in FIGS. 1 and 2), transverse to the longitudinal direction 51. Preferably, the lateral feed mechanism 70 displaces the boards 16 to a staging area located proximal to the longitudinal feed mechanism 50, and the feed area. The lateral feed mechanism 70 preferably includes one or more endless belts or chains 73 which extend by the sensor 34, or through the scan curtain, and rotate in the lateral direction 72. The belts 73 define a horizontal plane along which the boards 16 are moved. A motor (not shown) is coupled to the belt 72 and is selectively operated to selectively move the belt 72, and thus the boards 16.

A plurality of vertically pivoting or moving stops 80 separate the boards 16. The stops 80 are pairs of arms with one end pivotally coupled to the frame 42 and oriented to pivot vertically in a reciprocal manner, indicated by arrow 82. The other end of the arm is a stop end 84 which extends past the belts 73, or through the horizontal plane and into the lateral path of the boards 16. Actuators (not shown) are coupled to and between the arms and the frame 42 for selectively reciprocating the arms up and down. The boards 16 travel laterally 72 on the endless belts 70 until they abut one of the stop ends 84. As the stops 80 pivot or move downwardly, the boards 16 are allowed to progress or continue laterally.

Figure 3:
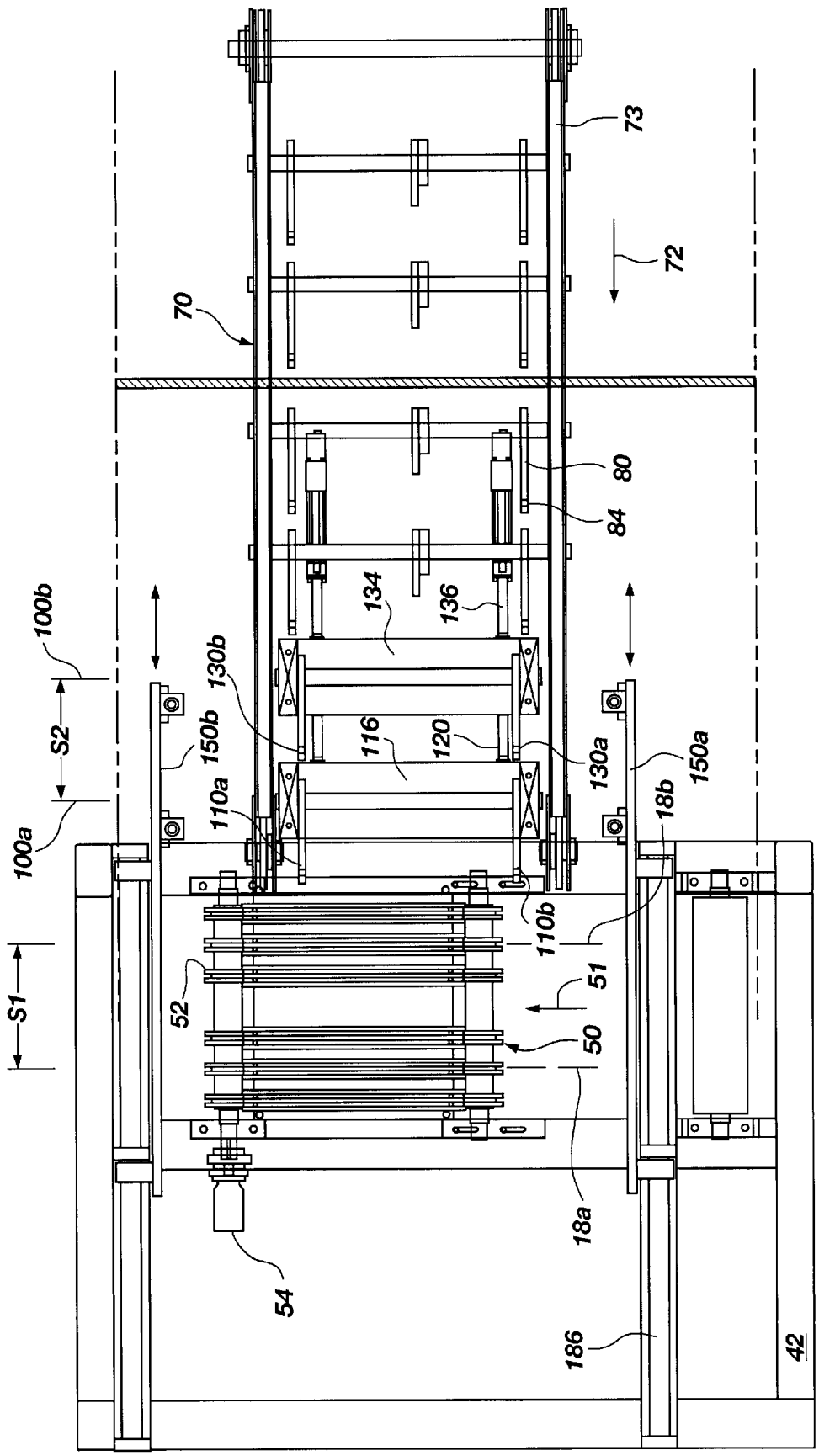
FIG. 3 is a top view of the preferred embodiment of the apparatus for positioning, orienting, and feeding boards in the sawmill operation of the present invention, with a portion of the longitudinal feed mechanism removed for clarity.

As indicated above, preferably the boards 16 eventually reach the queing or stagging area adjacent the feed area. Referring to FIG. 3, first and second alignment axes 100a and 100b are parallel with, and spaced apart from, the first and second saw axes 18a ad 18b, respectively, in the staging area. Each alignment axis 100a and 100b preferably is spaced the same distance from the corresponding saw axis 18a and 18b. The alignment axes 100a and 100b represent the saw axes or centerlines 18a and 18b at a distance from the actual saw axes, and are used to position and orient the first and second boards 22a and 22b, respectively, prior to being transported into the feed area.

Referring to FIGS. 3 and 8, the stops 80 include a first pair of spaced-apart movable stops 110, including first and second stops 110a and 110b, movably located on the frame 42 at the staging area proximal to the feed area, and longitudinal feed mechanism 50, for abutting the edge 30a of the first board 22a of a set of boards. The first pair of stops 110 cooperatively and independently move in the lateral direction 72 to both (1) orient the first board axis 26a parallel to the first alignment axis 100a, and (2) position the first board axis 26a in a common vertical plane 112a with the first alignment axis 100a. Thus, the first board axis 26a is also oriented parallel with the first saw axis 18a, and spaced a known distance from the first saw axis. The first and second stops 110a and 110b move independently in the lateral direction 72, as indicated by arrows 114a and 114b, respectively.

Referring again to FIG. 1, the first pair of stops 110 are disposed on slide members 116 which slidably engage a slide or track 118. Actuators 120 are coupled to and between the slide members 116 and the frame 42. The actuators 120 are responsive to the control signals to position the slide members 116, and thus the stops 110, back or forth in the lateral direction 72 either towards or away from the first alignment axis 100a.

In addition, a second pair of spaced-apart movable stops 130, including first and second stops 130a and 130b, are advantageously movably located on the frame 42 at the staging area proximal to the first pair of stops 110, for abutting the edge 30b of the second board 22b of the set of boards. Similarly to the first pair of stops 110, the second pair of stops 130 likewise cooperatively and independently move in the lateral direction 72, but to (1) orient the second board axis 26b parallel to the second alignment axis 100b, and (2) position the second board axis 26b in a common vertical plane 112b with the second alignment axis 100b. Thus, the second board axis 26b is oriented parallel with the second saw axis 18b, and spaced a known distance from the second saw axis. The first and second stops 130a and 130b move independently in the lateral direction 72, as indicated by arrows 132a and 132b, respectively.

In addition, the second pair of stops 130 are disposed on second slide members 134 which slidably engage the slide or track 118. Actuators 136 are coupled to and between the slide members 134 and the frame 42. The actuators 136 are responsive to the control signals to position the slide members 134, and thus the stops 130, back or forth in the lateral direction 72 either towards or away from the second alignment axis 100b.

The first and second pairs of stops 110 and 130 operate independently from one another, and move independently of one another, to orient and position separate and different boards, namely first and second boards 22a and 22b. Thus, the apparatus 10 of the present invention treats or processes each board 16 individually to maximize the yield from each board. Each board 16 is analyzed as it passes by the sensor 34, or through the scan curtain, with respect to its particular size, shape, and character. The computer 38 determines the maximum yield obtainable from each board 16 individually by determining the largest piece(s), or most valued piece, of lumber that may be cut from the board (represented by the dashed lines on the boards in FIG. 8). The computer 38 also determines how the boards 16 must be oriented and positioned with respect to the saw axes 18a and 18b, and thus the blades of the saw 14, to cut the determined lumber from the boards. Control signals are generated by the computer 38 to control the actuators, or the controllers that control the actuators, to position and orient the pairs of stops 110 and 130.

As indicated above, preferably the pairs of stops 110 and 130, and thus the boards 22a and 22b, are positioned and oriented with respect to the alignment axes 100a and 100b, rather than the actual saw axes 18a and 18b. As indicated above, the alignment axes 100a and 100b are pseudo saw axes, or represent the saw axes 18a and 18b at a distance from the actual saw axes. Thus, the boards 22a and 22b in the stagging or queing area on the lateral feed mechanism 70 are pre-aligned and pre-oriented according to the unique characteristics of each individual board.

In addition, as discussed more fully below, the first and second pairs of stops 110 and 130 orient and position a second set of boards in the staging area on the lateral feed mechanism 70 while the longitudinal feed mechanism 50 simultaneously feeds the first set of boards 22 into the saw. Thus, by having separate feed and staging areas, or by feeding the boards in one area and orienting them in another area, a second set of boards may be pre-aligned and pre-oriented while the first set of boards are fed.

Alternatively, the first and second pair of stops 110 and 130 may themselves be located in the feed area, rather than the staging area, and the lateral feed mechanism 70 may displace boards 16 directly into the longitudinal feed mechanism 50, as opposed to the staging area adjacent the feed area. Thus, the first and second pair of stops 110 and 130, and thus the boards 22a and 22b, may be positioned and oriented with respect to the saw aces 18a and 18b themselves, rather than the alignment axes 100a and 100b. As indicated above, however, such a configuration could not pre-orient and pre-position a second set of boards while the first set of boards was feeding into the saw. Such a configuration would require the first set of boards to be feed into the saw before a second set of boards could be displaced into the feed mechanism and aligned with the saw axes.

A pair of displacement members or arms 150a and 150b is movably disposed on the frame 42 for simultaneously displacing the pre-oriented and pre-positioned boards 22a and 22b from the stagging area to the feed area, or from the lateral feed mechanism 70 to the longitudinal feed mechanism 50. Preferably, the arms 150a and 150b are movably attached at opposite ends of the frame 42 to grasp the boards 22 at different points along their lengths. The arms 150a and 150b move between the staging area, shown in solid lines in FIGS. 1 and 2, and the feed area, shown in dashed lines in FIGS. 1 and 2, a distance d generally equal to the distance between the saw axes 18a and 18b and the alignment axes 100a and 100b, respectively.

Referring to FIGS. 6 and 7, the arms 150a and 150b preferably are C-shaped members having upper and lower extensions 152 and 154 which simultaneously extend above and below, respectively, both of the boards 22a and 22b. A gap or space 156 is defined between the extensions 152 and 154 which provides clearance for receiving a first set of boards 22 in the feed area as the arms 150a and 150b extend past the first set of boards 22 feeding into the saw 14 to pick up a second set of boards at the staging area. Thus, the arms 150a and 150b, or the extensions 152 and 154, are sized to extend past the first set of boards 22 feeding in the feed area to a second set of boards in the staging area. As indicated above, the gap 156 formed by the extensions 152 and 154 allows the first set of boards to be feed into the saw while the arm 150 moves to the staging area to obtain a second set of boards.

Each arm 150a and 150b has a pair of spaced-apart grips or clamps, such as first and second grips 160a and 160b, for releasably engaging the first and second boards 22a and 22b, respectively. The grips 160a and 160b are spaced apart a distance generally equal to the distance between the first and second saw axes 18a and 18b, and the first and second alignment axes 100a and 100b. Thus, the grips 160a and 160b may engage both first and second boards 22a and 22b simultaneously. The grips 160a and 160b are fixed with respect to one another so that the boards 22a and 22b are maintained in the correct position with respect to one another as they are moved between the staging area and feed area.

The grips 160a and 160b are each comprised of an upper clamp member 170 attached to the upper extension 152 of the C-shaped arm 160a, and a lower clamp member 170 attached to the lower extension 154 so that both are in general vertical alignment. The upper clamp member 170 engages the upper side of the boards 22 while the lower clamp member 172 engages the lower side. An upper actuator 176 moves the upper clamp member 170 in a reciprocating vertical motion to engage and release the upper side of the boards 22, while a lower actuator 178 similarly moves the lower clamp member 172 to engage and release the lower side. Each actuator 176 and 178 exerts an amount of force against the boards 22 through the clamps members 170 and 172, respectively, so that the boards 22 are grasped between the clamp members 170 and 172.

Preferably, the lower actuator 178 is configured to exert greater force against the boards 22 than the upper actuator 176. Thus, the boards 22 are displaced a distance vertically upwards when grasped by the grips 160a and 160b, or the clamp members 170 and 172. The actuators 176 and 178 may be similar piston/cylinder type actuators, but upper actuator 176 may be pneumatic, while the lower actuator 178 is hydraulic so that the hydraulic lower actuator 178 overcomes the pneumatic upper actuator 176, displacing the boards 22 upwardly. Alternatively, both upper and lower actuators may be either pneumatic or hydraulic, but sized so that the lower actuator exerts a greater force. The vertical displacement of the boards 22 when grasped lifts the boards from the lateral feed mechanism 70, or belt 73, and helps the boards 22 clear the stops 110 and 130. When the grips 160a and 160b release the boards 22 in the feed area, the boards 22 move downwardly onto the longitudinal feed mechanism 50, or belt 52.

Referring to FIGS. 1 and 6, arm actuators 182 are coupled to and between the arms 150a and 150b and the frame 42 for reciprocally displacing the arms back and forth between the staging and feeding areas, or longitudinal and lateral feed mechanisms 50 and 70. As indicated above, the alignment axes 100a and 100b are spaced a known, constant distance from the actual saw axes 18a and 18b, respectively, while the boards 22a and 22b are aligned with the alignment axes 100a and 100b, respectively, moved by the arms 150a and 150b, and then fed along the saw axes 18a and 18b. In addition, the boards 22 are pre-oriented and pre-aligned by the stops 110 and 130 in the staging area. Thus, the arms 150a and 150b repeatedly move a known, fixed distance to transport the boards 22a and 22b without the need to further align or orient the boards.

Figure 2:
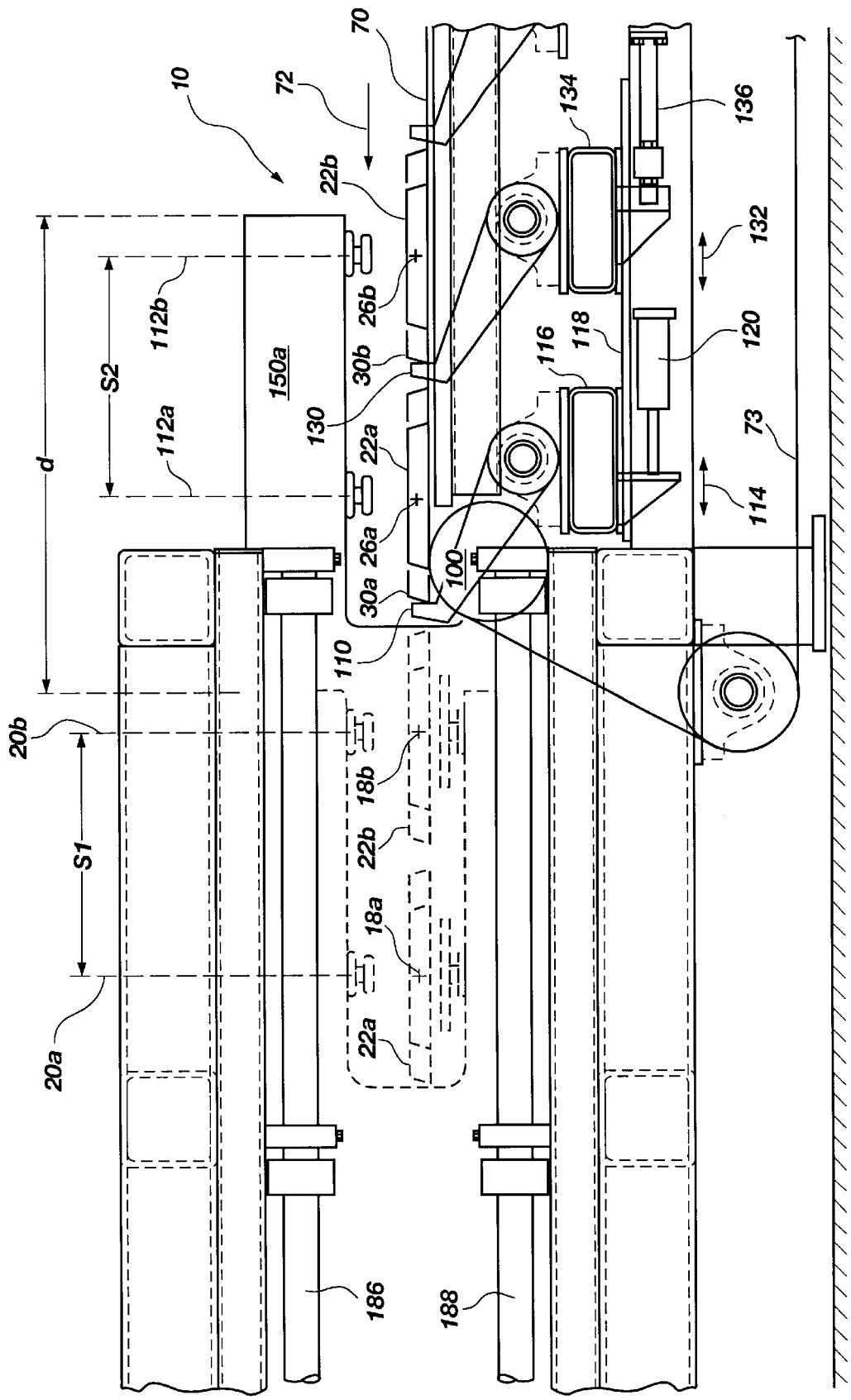
FIG. 2 is a detailed, partial end view of the preferred embodiment of the apparatus for positioning, orienting, and feeding boards in the sawmill operation of the present invention, with the longitudinal feed mechanism removed for clarity.

Referring to FIG. 2, each arm 150a and 150b is movably or slidably coupled to the frame 42. The arms 150a and 150b move along upper and lower cylindrical shafts or tracks 186 and 188. Referring to FIG. 7, upper and lower slides 192 and 194 are attached to the upper and lower extensions 152 and 154 of the arms 150a and 150b for engaging the shafts 186 and 188, respectively.

Alternatively, separate arms may be used to displace each board from the staging area to the feed area. With such a configuration, the alignment axes need not be spaced apart a distance equal to the spacing of the saw axes because the separate arms may displace different distances.

The apparatus 10 of the present invention provides significant advantages over prior art feed devices. Namely, the apparatus 10 of the present invention feeds a first set of two or more boards into a saw while simultaneously pre-orienting and pre-aligning a second set of two or more boards. Thus, in addition to aligning and orienting second boards while feeding first boards, the apparatus 10 advantageously orients, positions and feeds sets of two or more boards at a time, essentially doubling the piece rate of the system. Therefore, the piece rate of the is essentially doubled without increasing the speed of the machine and decreasing accuracy. Furthermore, the apparatus 10 scans, analyzes, orients, and aligns each board individually to account for the differences in boards. Thus, the apparatus 10 advantageously processes each board individually, or optimizes the yield of each board individually, to maximize the yield rate.

Referring to FIG. 8, a process for using the apparatus 10 of the present invention for feeding two different boards 22a and 22b into a saw is shown schematically. Two boards 22a and 22b are show at A prior to being scanned or measured. As indicated above, the two boards 22a and 22b are different. The boards 22a and 22b are feed along the lateral direction 72 by the lateral feed mechanism 70. The sensor 34 or scan curtain scans the boards or otherwise analyzes the boards to determine specific characteristics of the boards, such as size and shape. The controller 38 determines the maximum yield, or largest piece of lumber, or most pieces of lumber, that may be obtained from the boards, indicated by the dashed lines on the boards shown at B. In addition, the controller 38 determines the location and orientation of the board axes 26a and 26b with respect to the edges 30a and 30b of each board 22a and 22b, respectively. The board axes 26a and 26b may be the centerlines for the lumber. Furthermore, the controller 38 may determine the position and orientation of the board axes 26a and 26b with respect to the saw axes 18a and 18b, or the alignment axes 100a and 100b, and produce a control signal.

The lateral feed mechanism 70 continues to feed the boards 22a and 22b laterally 70 preferably until the boards reach the stagging area. The boards are separated by stops 80 which abut the leading edges 30 and 30b of the boards, shown at B. In the stagging area, each board 22a and 22b abuts a different pair of stops 110 and 130, respectively. As indicated above, the boards may be displaced directly into the feed area.

The boards 22a and 22b, or board axes 26a and 26b, are separately oriented parallel with the alignment axes 100a and 100b. In addition, the boards 22a and 22b are separately positioned so that each board axis 26a and 26b is vertically coplanar with a vertical plane 112a and 112b common to the alignment axes 100a and 110b, respectively. The first pair of stops 110a and 110b separately displace towards or away from the first alignment axis 100a, indicated by arrows 114a and 114b, to align the board axis 26a of the first board 22a with the first alignment axis 100a. Similarly, the second pair of stops 130a and 130b likewise separately displace towards or away from the second alignment axis 100b, indicated by arrows 130a and 130b, to align the board axis 26b of the second board 22b with the second alignment axis 100b. Although the boards are separately aligned, they may be simultaneously aligned, or the first and second pairs of stops 110 and 130 may operate separately from one another, but simultaneously.

Both the first and second boards 22a and 22b are simultaneously displaced from the staging area, or lateral feed mechanism 70, to the feeding area, or longitudinal feed mechanism 50. Because the boards 22a and 22b have already been pre-oriented and pre-aligned, it is only necessary to move them to the feed area where they will be vertically coplanar with the saw axes 18a and 18b, respectively, as shown at D. The boards are then fed longitudinally 51 from the feed area into the saw along the saw axes by the longitudinal feed mechanism 50. The saw has blades, indicated generally at 200, for cutting the boards into lumber as determined by the controller.

While the first set of boards 22 is fed into the saw, a second set of boards may be aligned by the first and second pairs of stops 110 and 130, and immediately transported by the arms from the staging area to the feed area after the first set of boards 22 has cleared the longitudinal feed mechanism 50.

As indicated above, the boards preferably are displaced by the lateral feed mechanism to a staging area adjacent the longitudinal feed mechanism and feed area. Alternatively, however, the boards may be displaced by the lateral feed mechanism directly to the longitudinal feed mechanism and feed area. In such a case, the staging or queing area and feed area are the same location, and the alignment axes are colinear with the saw axes.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. An apparatus configured to separately orient and position first and second different boards having edges and first and second board axes, respectively, and to simultaneously feed the first and second boards along first and second saw axes, respectively, into at least one saw, the apparatus comprising:
    a lateral feed mechanism configured for displacing the boards in a lateral direction transverse to the saw axes to a staging area,
    the staging area having first and second alignment axes parallel with and spaced known equal distances from the first and second saw axes, respectively, the first and second alignment axes being spaced apart from one another a distance generally equal to the distance between the first and second saw axes;
    a first pair of spaced apart, movable stops located at the staging area and configured for abutting the edge of the first board, the first pair of stops being cooperatively and independently moveably with respect to one another in the lateral direction to orient the first board axis parallel with the first alignment axis, and to position the first board axis in a common vertical plane with the first alignment axis, such that the first board axis is parallel with and spaced a known distance from the first saw axis;
    a second pair of spaced apart, movable stops independent from the first pair of stops and located at the staging area proximal to the first pair of stops and configured for abutting the edge of the second board, the second pair of stops being cooperatively and independently moveably with respect to one another in the lateral direction to orient the second board axis parallel with the second alignment axis, and to position the second board axis in a common vertical plane with the second alignment axis, such that the second board axis is parallel with and spaced a known distance from the second saw axis, and such that the first and second boards are separately oriented and separately positioned with respect to the alignment axes;
    a displacement arm located proximal to the staging area and movable between the staging area and a feed area a distance generally equal to the distance between the first and second alignment axes and the first and second saw axes, respectively, the arm being configured for engaging and simultaneously displacing the first and second boards together in the lateral direction from the staging area to the feed area, the arm having a length sized to extend to both the first and second boards, such that the first and second boards are simultaneously displaced laterally equal distances from the staging area to the feed area;
    first and second spaced apart grips attached to the arm and configured for releasably engaging the first and second boards, respectively, the first and second grips being spaced apart from one another a distance generally equal to the distance between the first and second saw axes and the first and second alignment axes;
    a longitudinal feed mechanism located in the feed area and configured for engaging and feeding the first and second boards in a longitudinal direction transverse to the lateral direction into the at least one saw along the first and second feed axes, respectively.

2. The system of claim 1, wherein the displacement arm comprises a pair of arms which engage the first and second boards at different points along the lengths thereof.

3. The system of claim 1, wherein the displacement arm is a C-shaped member having upper and lower extensions configured for simultaneously extending above and below, respectively, both of the boards.

4. The system of claim 1, wherein each of the grips comprises:
    an upper clamp member configured for engaging an upper side of the board and having an upper actuator configured for exerting an amount of force on the upper side of the board; and
    a lower clamp member configured for engaging a lower side of the board and having a lower actuator and configured for exerting an amount of force on the lower side of the board greater than the amount of force exerted by the upper actuator such that the board is displaced in a vertically upward direction by the lower clamp member.

5. An apparatus configured to separately orient and position first and second different boards having different edges and first and second board axes, respectively, and to simultaneously feed the first and second boards along first and second saw axes, respectively, into at least one saw, the apparatus comprising:
    a lateral feed mechanism configured for displacing the boards in a lateral direction transverse to the saw axes to a staging area on one side of the saw axes,
    the staging area having first and second spaced-apart alignment axes parallel with and spaced-apart from the first and second saw axes, respectively;
    a first pair of movable stops located at the staging area and configured for abutting the edge of the first board, the first pair of stops being cooperatively and independently moveably with respect to one another in the lateral direction to orient the first board axis parallel with the first alignment axis, and to position the first board axis in a common vertical plane with the first alignment axis;
    a second pair of movable stops independent from the first pair of stops and located at the staging area proximal to the first pair of stops and configured for abutting the edge of the second board, the second pair of stops being cooperatively and independently moveably with respect to one another in the lateral direction to orient the second board axis parallel with the second alignment axis, and to position the second board axis in a common vertical plane with the second alignment axis, such that the first and second boards are separately oriented and separately positioned with respect to the first and second alignment axes, respectively;

a displacement member movable in the lateral direction between the staging area and a feed area and configured for engaging and simultaneously displacing the first and second boards together from the staging area to the feed area, the member having a length sized to extend to both the first and second boards, such that the first and second boards are simultaneously displaced laterally from the staging area to the feed area;

first and second spaced-apart grips attached to the member and configured for releasably engaging the first and second boards, respectively; and a longitudinal feed mechanism located in the feed area and configured for engaging and simultaneously feeding the first and second boards in a longitudinal direction transverse to the lateral direction into the at least one saw along the first and second feed axes, respectively.

6. The apparatus of claim 5, wherein the displacement member comprises a pair of arms which engage the first and second boards at different points along the lengths thereof.

7. The apparatus of claim 5, wherein the displacement member is a C-shaped member having upper and lower extensions configured for simultaneously extending above and below, respectively, both of the boards.

8. The apparatus of claim 5, wherein each of the grips comprises:

an upper clamp member configured for engaging an upper side of the board and having an upper actuator configured for exerting an amount of force on the upper side of the board; and a lower clamp member configured for engaging a lower side of the board and having a lower actuator configured for exerting an amount of force on the lower side of the board greater than the amount of force exerted by the upper actuator such that the board is displaced in a vertically upward direction by the lower clamp member.

9. An apparatus configured to separately orient and simultaneously feed two different boards having edges and board axes along two saw axes into at least one saw, the apparatus comprising:

a frame configured to be disposed proximal to the at least one saw;

a longitudinal feed mechanism attached to the frame and configured for engaging and feeding each of the boards in a longitudinal direction along a different one of the two feed axes into the at least one saw;

a lateral feed mechanism located proximal to the longitudinal feed mechanism and configured for displacing the boards in a lateral direction transverse to the longitudinal direction to a staging area located proximal to one side of the longitudinal feed mechanism, the staging area having two alignment axes corresponding to the two saw axes, each alignment axis being parallel with and spaced-apart from a different one of the at least two saw axes;

a first pair of stops movably attached to the frame at the staging area proximal to the longitudinal feed mechanism and configured for abutting the edge of one of the two boards, the first pair of stops being cooperatively and independently moveably in the lateral direction to orient the board axis of one of the boards parallel to one of the alignment axes, and to position the same board axis in a common vertical plane with the same alignment axis;

a second pair of stops independent from the first pair of stops and movably attached to the frame at the staging area proximal to the first pair of stops and configured for abutting the edge of the other of the two boards, the second pair of stops being cooperatively and independently moveably in the lateral direction to orient the board axis of the other of the two boards parallel to the other of the alignment axes, and to position the same board axis in a common vertical plane with the same alignment axis;

a displacement member movably disposed on the frame and movable in the lateral direction between the staging area and the feeding area, and configured for engaging and simultaneously displacing the two boards from the staging area to the feed area; and two spaced-apart grips attached to the member, each grip configured for releasably engaging one of the boards.

10. The system of claim 9, wherein the displacement member comprises a pair of arms located at different positions on the frame.

11. The system of claim 9, wherein the displacement member is a C-shaped member having upper and lower extensions configured for extending simultaneously above and below, respectively, both of the boards.

12. The system of claim 9, wherein each of the grips comprises:

an upper clamp member configured for engaging an upper side of the board and having an upper actuator configured for exerting an amount of force on the upper side of the board; and a lower clamp member configured for engaging a lower side of the board and having a lower actuator and configured for exerting an amount of force on the lower side of the board greater than the amount of force exerted by the upper actuator such that the board is displaced in a vertically upward direction by the lower clamp member.

13. An apparatus configured to separately orient and simultaneously feed at least two different boards having edges and board axes along at least two saw axes into at least one saw, the apparatus comprising:

an elongated frame configured to be disposed proximal to the at least one saw;

a longitudinal feed mechanism attached to the frame and configured for engaging and feeding each of the boards in a longitudinal direction into the at least one saw along a different one of the at least two feed axes;

a lateral feed mechanism located proximal to the longitudinal feed mechanism and configured for displacing the boards in a lateral direction transverse to the longitudinal direction to a staging area located the longitudinal feed mechanism, the staging area having at least two spaced-apart alignment axes each parallel with and spaced apart from a different one of the at least two saw axes;

a first pair of spaced apart, movable stops attached to the frame at the staging area proximal to the longitudinal feed mechanism and configured for abutting the edge of one of the at least two boards, the first pair of stops being cooperatively and independently moveably in a lateral direction transverse to the longitudinal direction to orient the board axis of one of the boards parallel to one of the alignment axes, and to position the same board axis in a common vertical plane with the same alignment axis;

a second pair of spaced apart, movable stops independent from the first pair of stops and attached to the frame at the staging area proximal to the first pair of stops and configured for abutting the edge of the other of the at least two boards, the second pair of stops being cooperatively and independently moveably in a lateral direction transverse to the longitudinal direction to orient the board axis of the other of the boards parallel to the other of the alignment axes, and to position the same board axis in a common vertical plane with the same alignment axis;

at least one arm movably disposed on the frame and moving between the staging area and the feed area, the at least one arm being configured for simultaneously displacing the at least two boards in the lateral direction from the staging area to the feed area; and at least a pair of spaced apart grips attached to the at least one arm, each grip configured for releasably engaging a different one of the at least two boards.

14. The apparatus of claim 13, wherein the at least one arm comprises a pair of arms which engage the at least two boards at different points along the lengths thereof.

15. The apparatus of claim 13, wherein the at least one arm is a C-shaped member having upper and lower extensions configured for simultaneously extending above and below, respectively, both of the boards.

16. The apparatus of claim 13, wherein each of the grips comprise:

an upper clamp member configured for engaging an upper side of the board and having an upper actuator configured for exerting an amount of force on the upper side of the board; and a lower clamp member configured for engaging a lower side of the board and having a lower actuator and configured for exerting an amount of force on the lower side of the board greater than the amount of force exerted by the upper actuator such that the board is displaced in a vertically upward direction by the lower clamp.

17. An apparatus configured to feed at least two boards having different edges and board axes into at least one saw having saw axes, the apparatus comprising:

a) a lateral feed mechanism configured to displace the at least two boards in a lateral direction transverse to the saw axes to a staging area having alignment axes corresponding to and spaced-apart from the saw axes;

b) first and second movable stops, disposed adjacent one another in the staging area, each configured to abut the edges of a different one of the at least two boards, the first and second stops being independently moveable with respect to one another in the lateral direction to separately orient and separately position the board axes with respect to the alignment axes;

c) a displacement member, movable in the lateral direction between the staging area and a feed area, configured to engage and simultaneously displace the at least two boards together from the staging area to the feed area; and d) a longitudinal feed mechanism, disposed in the feed area, configured to engage and feed the at least two boards in a longitudinal direction transverse to the lateral direction into the at least one saw along the saw axes.

18. The apparatus of claim 17, wherein the displacement member has a size to extend to both of the at least two boards; and further comprising:

first and second spaced-apart grips, attached to the displacement member, configured to releasably engage the at least two boards.

19. The apparatus of claim 18, wherein each of the grips includes:

an upper clamp member configured to engage an upper side of the board and having an upper actuator configured to exert an amount of force on the upper side of the board; and a lower clamp member configured to engage a lower side of the board and having a lower actuator configured to exert an amount of force on the lower side of the board greater than the amount of force exerted by the upper actuator, such that the board is displaced in a vertically upward direction by the lower clamp member.

20. The apparatus of claim 17, wherein the first and second stops each include:

a pair of movable stops configured to abut the edge of a board at different locations along the length of the board, the pair of stops being cooperatively and independently moveably with respect to one another in the lateral direction to orient and position the board in the staging area.

21. The apparatus of claim 17, wherein the displacement member is a C-shaped member having upper and lower extensions configured to simultaneously extend above and below, respectively, both of the at least two boards.

22. An apparatus configured to separately orient and position first and second different boards having edges and first and second board axes, respectively, and to simultaneously feed the first and second boards along first and second saw axes, respectively, into at least one saw, the apparatus comprising:

a) a frame configured to be located proximal to the at least one saw;

b) a longitudinal feed mechanism, disposed on the frame, configured to engage and simultaneously feed the first and second boards in a longitudinal direction along the respective first and second saw axes into the at least one saw;

c) a lateral feed mechanism, disposed proximal the longitudinal feed mechanism, configured to displace the first and second boards in a lateral direction transverse to the saw axes and longitudinal axis to a staging area;

d) first and second alignment axes, located at the staging area, spaced apart from and corresponding to the respective first and second saw axes;

e) a first pair of stops, movably disposed at spaced apart locations in the staging area, configured to abut the edge of the first board, the first pair of stops being cooperatively and independently moveably with respect to one another in the lateral direction to:
1) orient the first board axis parallel with the first alignment axis, and
2) position the first board axis in a common vertical plane with the first alignment axis;

f) a second pair of stops, movably disposed at spaced apart locations in the staging area, independent from the first pair of stops, configured to abut the edge of the second board, the second pair of stops being cooperatively and independently moveably with respect to one another in the lateral direction to:
1) orient the second board axis parallel with the second alignment axis, and
2) position the second board axis in a common vertical plane with the second alignment axis;

g) a displacement arm, disposed on the frame, movable between the staging area and a feed area, configured to engage and simultaneously displace the first and second boards together in the lateral direction from the staging area to the feed area, the arm having a length sized to extend to both the first and second boards;

h) first and second grips, disposed on the arm, configured to releasably engage the respective first and second boards.

23. The apparatus of claim 22, wherein each of the grips includes:

an upper clamp member configured to engage an upper side of the board and having an upper actuator configured to exert an amount of force on the upper side of the board; and a lower clamp member configured to engage a lower side of the board and having a lower actuator configured to exert an amount of force on the lower side of the board greater than the amount of force exerted by the upper actuator, such that the board is displaced in a vertically upward direction by the lower clamp member.

24. The apparatus of claim 22, wherein the displacement member is a C-shaped member having upper and lower extensions configured to simultaneously extend above and below, respectively, both of the at least two boards.

* * * * *